United States Patent [19]
Benton

[11] 3,976,735
[45] Aug. 24, 1976

[54] FABRICATION OF BORON ARTICLES

[75] Inventor: Samuel T. Benton, Knoxville, Tenn.

[73] Assignee: The United States of America as represented by the United States Energy Research and Development Administration, Washington, D.C.

[22] Filed: Sept. 30, 1974

[21] Appl. No.: 510,943

[52] U.S. Cl. ............................... 264/125; 75/226; 176/93 BP; 264/332
[51] Int. Cl.² ............................................. B29J 1/00
[58] Field of Search ................. 176/93 BP; 264/120, 264/122, 125, 56, 60, 332; 423/291, 298; 75/226

[56] References Cited
UNITED STATES PATENTS

| | | | |
|---|---|---|---|
| 1,501,419 | 7/1924 | Podszus | 423/291 |
| 2,728,128 | 12/1965 | Sheer et al. | 264/125 X |
| 2,920,025 | 1/1960 | Anderson | 176/93 BP |
| 2,990,261 | 6/1961 | Griener | 423/298 X |
| 3,314,859 | 4/1967 | Anthony | 176/93 BP |
| 3,338,679 | 8/1967 | Muta et al. | 423/291 |
| 3,440,312 | 4/1969 | Allieyro | 264/125 |
| 3,510,398 | 5/1970 | Wood | 176/93 BP |
| 3,557,266 | 1/1971 | Chiba et al. | 264/125 X |
| 3,720,740 | 3/1973 | Muta et al. | 264/125 |

FOREIGN PATENTS OR APPLICATIONS

| | | | |
|---|---|---|---|
| 763,873 | 7/1967 | Canada | 423/298 |

*Primary Examiner*—Richard E. Schafer
*Attorney, Agent, or Firm*—Dean E. Carlson; David S. Zachry; Earl L. Larcher

[57] ABSTRACT

This invention is directed to the fabrication of boron articles by a powder metallurgical method wherein the articles are of a density close to the theoretical density of boron and are essentially crackfree. The method comprises the steps of admixing 1 to 10 weight percent carbon powder with amorphous boron powder, cold pressing the mixture and then hot pressing the cold pressed compact into the desired article. The addition of the carbon to the mixture provides a pressing aid for inhibiting the cracking of the hot pressed article and is of a concentration less than that which would cause the articles to possess significant concentrations of boron carbide.

3 Claims, No Drawings

FABRICATION OF BORON ARTICLES

The present invention relates generally to the fabrication of boron articles, and more particularly to a method wherein a small amount of carbon is combined with the boron for providing a pressing aid to inhibit cracking of the articles upon hot pressing. This invention was made in the course of, or under, a contract with the U.S. Atomic Energy Commission.

Boron in elemental form and boron-10 have been found to be of considerable value in reactor applicators as burnable poisons or for the fabrication of control rods. Previous efforts in fabricating high density, high purity boron articles by metallurgical procedures have been somewhat unsuccessful due to the presence of deleterious cracks in the articles. These previous efforts included such metallurgical techniques as hot pressing boron powder by first preparing crystalline boron from amorphous powder, grinding and screening the powder, washing the powder in hydrochloric acid to reduce the contamination resulting from the grinding and screening steps, and then finally hot pressing the powder. However, this technique as well as other known techniques suffered some problems, particularly the extensive cracking of the elemental boron and boron-10 compacts when hot pressed.

Accordingly it is the principal aim or goal of the present invention to substantially minimize or obviate the above and other shortcomings previously encountered in the preparation of boron articles by hot pressing boron powders. This goal is achieved by mixing boron powder in an amorphous state with 1 to 10 weight percent carbon, cold pressing the powder mixture, and thereafter hot pressing the compact into the desired boron article. The addition of the carbon functions as a crack-inhibiting pressing aid.

Other and further objects of the invention will be obvious upon an understanding of the illustrative method about to be described or will be indicated in the appended claims, and various advantages not referred to herein will occur to one skilled in the art upon employment of the invention in practice.

Described generally, the present invention is directed to the preparation of articles or structures of elemental boron and boron-10 by hot pressing boron powders into the desired article configuration. These articles are of near theoretical density, virtually crack-free, and of a composition wherein boron is the major constituent. These articles are prepared by blending amorphous boron powder with 5 to 10 weight percent carbon, cold pressing the powder mixture, encapsulating the cold pressed compact in a casing of boron nitride powder and elemental boron which functions as a carbon getter, and then hot pressing the boron-carbon compact in a graphite die. The X-ray diffraction patterns taken of the hot pressed article showed strong lines for boron, intermediate lines for boron carbide ($B_4C$), and weak lines for $B_7O$. The article also exhibited a crack-free surface, a density greater than 97 percent of the theoretical density of boron (2.50 g/cc), and a porosity of less than 2 percent. A chemical analysis showed boron in a concentration of 82 to 88 weight percent and carbon in a concentration of 3.50 to 9.0 weight percent.

The boron powder employed in the method of the present invention is amorphous powder having an average particle size of $0.6\mu$. This powder may be produced in any suitable manner, such as by the reduction of boron oxide by magnesium, and the leaching of the boron by acid. The purification of this powder may be typically achieved by heating the reduced boron product with a large excess of boric acid followed by acid leaching. The boron can be commercially obtained with purity levels as high as 99.9 percent.

The carbon powder which is employed in the invention as the pressing aid is of an average particle size of about $1\mu$. The concentration of the carbon in the mixture is in the range of 1 to 10 weight percent. Carbon in a quantity less than the above minimum amount is insufficient to inhibit the cracking of the hot pressed article; whereas, a quantity of carbon greater than the above maximum amount, while inhibiting cracking, results in structures wherein the major constituent is boron carbide rather than boron.

Cold pressing the boron-carbon mixture has been found to reduce the porosity of the final article from about 3.5 percent to less than about 0.5 percent. The cold pressing step may be achieved in a suitable die at a pressure in the range of 2,000 to 10,000 psi or isostatically in a gas autoclave or oil isostat at a pressure in the range of about 10,000 to 30,000 psi for a duration of about 1 to 2 hours. Upon completing the cold pressing operation, the resulting compact, which is at a density in the range of 1.8 to 2.1 gms/cc, is hot pressed at a temperature in the range of 2150° to 2200°C and a pressure of 2000 to 5000 psi for a duration of about 1 to 2 hours. This hot pressing operation sinters together contiguously disposed boron particles and results in a crack-free structure of high purity and a density greater than 97 percent of theoretical.

In order to hot press the boron-carbon mixture, graphite is normally employed as the die material snce it is readily capable of withstanding the required temperatures and pressures. However, since boron is quite reactive with graphite, it is necessary to avoid contact between the boron powder and the graphite die for inhibiting the migration of carbon from the die into the boron compact. A satisfactory barrier between the boron powder and the graphite die may be readily provided by cold pressing the previously cold pressed compact of boron and carbon in the center of a boron nitride-boron powder (average particle size of $1\mu$) bed of at least 0.5 inch in thickness. This bed of boron nitride and boron contains about 5 percent elemental boron powder in an amorphous state to provide a carbon getter for further inhibiting the migration of carbon from the graphite die to the boron-carbon mixture being hot pressed. The use of this boron nitride-boron powder bed or shell also provides a quasi isostatically pressing effect upon the boron-carbon compact so as to provide a more uniform application of pressure against the compact while maintaining the shape of the compact during the hot pressing operation.

Upon completion of the hot pressing step, the encapsulated article is easily ejected from the graphite die and then the encompassing shell of boron nitride powder is broken away.

In order to provide a clearer understanding of the present invention, examples relating to typical fabrications of boron articles by practicing the method of this invention are set forth below.

EXAMPLE I

A crack-free boron-boron carbide pellet, 1 inch in length by 0.75 inch in diameter, was fabricated from a powder mixture provided by blending amorphous boron powder with 3 weight percent carbon powder.

This admixture was slurry blended and dried to assure a homogeneous mixture. The blended powder was then cold pressed in a steel die at a pressure of 5000 psi. The cold pressed pellet was positioned in a bed of boron nitride powder containing 5 percent amorphous elemental boron and subjected to a cold pressing operation to provide an encapsulated structure with a wall thickness of about 0.5 inch. The encapsulated pellet was hot pressed in a graphite die at a temperature of 2200°C and a pressure of 5000 psi for a duration of 2 hours. After cooling the hot pressed structure to room temperature, the encapsulated boron article was ejected from the die and the boron nitride shell broken away from the boron-carbon pellet. The pellet was determined to have a real density of 2.43 gms/cc which is 97.5 percent of the theoretical density of boron. An X-ray analysis of this pellet indicated a major crystalline structure of boron and minor crystalline structure of boron carbide.

EXAMPLE II

In another demonstration of the invention a crack-free boron-boron carbide pellet of a dimension of 1.0 inch in length by 0.75 inch in diameter was fabricated from a powder mixture containing 95 weight percent boron and 5 weight percent carbon. This mixture was fabricated into the pellet by practicing the steps set forth in Example I. The resulting hot pressed pellet had a real density of 2.46 gm/cc (98.4 percent of theoretical density). The X-ray analysis of the pellet indicated that the major constituent of the pellet was boron with about 25 percent boron carbide.

EXAMPLE III

A mixture of 90 weight percent boron and 10 weight percent carbon was formed into a high density, crack-free boron carbide pellet in the manner described in Example I. This pellet had a real density of 2.44 gm/cc (97.6 percent of the theoretical density). The X-ray analysis of the pellet indicated a crystalline structure of boron and boron carbide with the boron providing the major constituent.

It will be seen that the present invention provides a simple solution to overcoming a major cracking problem previously encountered in fabricating articles of boron by employing metallurgical procedures.

What is claimed is:

1. A powder-metallurgical method for fabricating a boron article having a density greater than 97 percent of the theoretical density of boron and an essentially crack-free finish, comprising the steps of blending amorphous boron powder and carbon powder, cold pressing the resulting boron-carbon blend at a pressure in the range of 2000 to 30,000 psi to form a compact, and thereafter hot pressing the compact at a temperature in the range of 2150° to 2200°C and a pressure in the range of 2000 to 5000 psi to form said article, said carbon being in the blend in an amount effective to inhibit the formation of cracks in the article during the hot pressing step and less than an amount which would provide a major concentration of boron carbide in the article.

2. The method claimed in claim 1, wherein the amount of carbon in said blend is in a range of 1 to 10 weight percent, and wherein said boron powder has an average particle size of $0.6\mu$ and said carbon has an average particle size of $1.0\mu$.

3. The method claimed in claim 2, wherein the hot pressing step is accomplished within a die formed of graphite, and including an additional step of encapsulating the compact in a shell of boron nitride powder and 5 weight percent elemental boron for gettering carbon migrating from the graphite die through said shell.

* * * * *